Patented Jan. 20, 1948

2,434,790

UNITED STATES PATENT OFFICE 2,434,790

STABILIZING FATTY MATERIALS

Loran O. Buxton, Newark, and Charles E. Dryden, East Orange, N. J., assignors to Nopco Chemical Company, Harrison, N. J., a corporation of New Jersey No Drawing. Application March 27, 1944, Serial No. 528,353

21 Claims. (Cl. 167—81)

The present invention relates to the stabilization of fatty materials. More particularly, the present invention relates to the preservation and stabilization of fatty materials such as fish liver oils or the like against oxidation.

In U. S. patent application, Serial No. 351,909, filed August 8, 1940, now U. S. Patent No. 2,345,-576, granted April 4, 1944, and U. S. application 397.547, filed June 11, 1941, now U. S. Patent No. 2,345,578, granted April 4, 1944, there are disclosed antioxidant concentrates which may be prepared from various types of oils and/or oil-bearing solids which are particularly applicable for the stabilization of fatty materials.

It has now been discovered that if antioxidants of the character described in the aforementioned patents are added to a fatty material and simultaneously, or thereafter, the mixture of fatty material and antioxidant is treated with ammonia, the antioxidant effect is greatly enhanced. Furthermore, the antioxidant concentrates may be treated with ammonia and thereafter the ammonia-treated concentrates may be added to fatty materials. In other words, the stabilized fatty material, after standing for a substantial time, will lose less of its vitamin value and will be less susceptible to oxidation if the material is combined with an antioxidant and then treated with ammonia, or if the antioxidant is treated with ammonia and thereafter added to the fatty material. It is believed that this is due to the formation in situ of new antioxidant substances, in both the antioxidant concentrate and in the fatty material. In some instances, these substances may be produced from components of the fatty material, which, prior to ammonia treatment, have no antioxidant value. In addition to these antioxidants, new and better antioxidant components are believed to be produced from the antioxidant concentrate disclosed in the aforementioned patents.

It is therefore one of the objects of the present invention to stabilize various types of fatty materials against oxidation.

A second object of the present invention is to stabilize the vitamin values of fatty materials containing the same as, for example, fish liver oils, by the addition of an antioxidant concentrate to the fish liver oil and thereafter treating the same with ammonia.

A third object of the invention is to form new antioxidant concentrates by treating antioxidant concentrates with ammonia.

Other objects and advantages of the present invention will become apparent from the subsequent specification and claims.

The present invention may be applied to various types of fatty materials such as fatty oils, fats, waxes, soaps, vitamin concentrates, etc. Thus oils and fats of animal, vegetable or fish origin, such as cod liver oils, as well as vitamin concentrates or vitamin containing fractions obtained from such oils; corn oil, cottonseed oil, soybean oil, and other vegetable oils; fats such as butter, margarine, lard, hydrogenated shortenings, palm oil, etc.; soaps of higher fatty acids; and compositions containing such fatty materials as essential ingredients, as, for example, cookies, cakes, crackers, breakfast cereals, etc., as well as food emulsions such as mayonnaise, may all be suitably stabilized in accordance with this invention. Furthermore, substances such as sulfonated oils and other sulfonated fatty compounds, amides, mono- and di-glycerides and other fatty substances which tend to become rancid upon exposure to air may be treated in accordance with the present invention. Other materials subject to change on oxidation which may be treated include cosmetics, such as face creams, hand lotions, shaving creams, etc.; gasoline, mineral oil, lubricating oils, rubber, etc. The amount of the extract added to the material to be stabilized may vary considerably, depending upon the activity of the extract and the degree of instability of the material to be stabilized. In general, from about 0.1% to about 20%, preferably from about 0.5% to about 5%, of antioxidant extract may be added to the oil or fat.

The present process is particularly applicable to the stabilization of fat-soluble vitamin-containing oils or concentrates, as well as vitamin-containing fractions recoverable from such products by vacuum distillation, solvent extraction or other processes.

Substances of a fatty nature stabilized in accordance with the present invention may be heated to elevated temperatures without substantially affecting the activity of the antioxidants; moreover, the heating of vitamin containing oils so stabilized does not substantially reduce the vitamin activity of the oils.

The present process may be practiced by adding to the fatty material of the character above set forth, a concentrate produced by extracting not only vegetable oils, but oil-bearing solids. The oil-bearing solid from which the antioxidants are extracted in accordance with the invention may be any oil-bearing solid containing naturally-occurring antioxidants or mixtures thereof. The term "fatty oil-bearing solid" is used throughout the specification and claims to include solids of plant or animal origin containing fats, fatty oils or fatty waxes. The oil-bearing solid may contain all the oil, fat or wax present in said solid in its natural state, or it may have had a substantial portion of the fatty material removed. There are many such solids containing natural antioxidants known to the art. Thus vegetable materials such as soybeans, wheat bran, wheat germ, corn germ, corn grain, oats, rye, olives, sesame seed, cottonseed, cocoa bean, palm kernels, copra, rice, rice germ, flax seed, teaseed, hemp seed, perilla seed, alfalfa seed, celery seed, mustard seed, rape seed, poppy seed, sunflower seed, pumpkin seed, melon seed, peanuts and the like, may be treated. Another group of materials that may be employed are fish livers such as the livers of cod, halibut, tuna, shark, etc., as well as the fish themselves. Other fish from which antioxidants may be obtained include sardine, menhaden, herring, and similar fish. Other materials which may be treated in accordance with my invention are tomato seeds, grape seeds, peach kernels, egg yolks, and whale livers. Preferably, however, the antioxidant concentrates used are solvent extracted from oil-bearing vegetable materials.

The present process is also applicable to antioxidant concentrates which are produced by solvent extraction from vegetable oils and similar types of oil containing relatively large proportions of antioxidant. Thus, vegetable oils and fats, such as soybean oil, wheat germ oil, corn germ oil, corn oil, oat oil, rye oil, olive oil, sesame oil, cottonseed oil, palm oil, cocoa butter, palm kernel oil, coconut oil, rice oil, rice germ oil, linseed oil, oitica oil, teaseed oil, perilla oil, alfalfa oil, celery seed oil, flax seed oil, groundnut oil, hemp seed oil, kapok oil, mustard seed oil, rape seed oil, poppy seed oil, sunflower seed oil, pumpkin seed oil, melon seed oil, peanut oil and the like may be treated. Another group of fatty materials which may be employed are the fish liver oils, such as cod liver oil, tuna liver oil, halibut liver oil, shark liver oil, etc., as well as other marine oils, such as menhaden oil, herring oil and sardine oil. Other oils which may be treated in accordance with my invention are tomato seed oil, grape seed oil, peach kernel oil, egg oil and whale oil. Preferably, the antioxidants are produced from vegetable oils.

The antioxidants are recovered from fatty materials with which they are associated by extraction with a suitable solvent. The solvent employed in accordance with the invention may be selected from a large number of aliphatic solvents found to be useful as a result of extensive experimentation; the choice of the solvent will depend to some extent upon the properties of the material to be treated, as will become more evident from the detailed description hereinafter given. Results have indicated that the solvents preferably employed are members of well recognized chemical classes; the number of carbon atoms in the solvent to be used is a particularly important factor in determining the availability thereof for use in the practice of the invention. The following table sets forth the classes of solvents particularly useful in the production of antioxidant concentrates used in the process of the invention.

Table

1. Aliphatic and alicyclic monohydroxy alcohols containing from 3 to 6 carbon atoms.
2. Esters formed by the reaction of aliphatic and alicyclic alcohols with aliphatic monocarboxylic acids, said esters containing not more than 8 carbon atoms.
3. Aliphatic and alicyclic aldehydes containing not more than 6 carbon atoms.
4. Aliphatic ketones containing not more than 6 carbon atoms.

Solvents falling in the classes above listed are all liquid aliphatic organic compounds having the properties of being miscible with fatty materials at temperatures above room temperature, i. e. 20° to 25° C., and partially immiscible therewith at temperatures substantially below room temperature, and experiments have shown that solvents falling within this class of compounds are particularly desirable.

In order to more fully illustrate the nature of the solvents employed, a partial list thereof is herewith given; it is to be understood, however, that this list is not intended to be complete, but is merely illustrative of the solvents which may be employed. Thus the following solvents may be used: n-propyl alcohol, isopropyl alcohol, n-butyl alcohol, n-amyl alcohol, isoamyl alcohol, secondary amyl alcohol, furfuryl alcohol, allyl alcohol, diacetone alcohol, beta-hydroxy ethyl acetate, methyl formate, ethyl formate, ethyl acetate, methyl acetate, isopropyl acetate, glycol diformate, glycol diacetate, methyl levulinate, ethyl levulinate, methyl aceto acetate, ethyl aceto acetate, methyl furoate, vinyl acetate, furfural propionaldehyde, crotonaldehyde, acetone, methyl ethyl ketone, acetonyl acetate and propylene chlorhydin. Mixtures of these solvents belong to that class of aliphatic organic compounds which have the properties of being miscible with fatty oils at temperatures above room temperature and partially immiscible therewith at temperatures substantially below room temperature; furthermore, it will be noted that the majority of these solvents have relatively low freezing points.

Occasionally, it may be found that certain of the solvents hereinabove mentioned may be too miscible with some of the fatty materials which may be treated to effect a separation of antioxidants therefrom; thus, for example, acetone is too miscible with many fatty materials. However, this condition may be easily corrected by diluting the solvent with either a small amount of water or with some liquid aliphatic organic solvent relatively immiscible with fatty materials. In general, it may be said that the effect of diluting any of the above solvents with water will be to render the solvent more immiscible with fatty materials, so that if difficulty is encountered in effecting proper separation of the antioxidant extracts from the fatty materials, this difficulty may generally be overcome by the addition of a small amount of water to the solvent.

The solvents preferably employed are the aliphatic alcohols containing from 3 to 6 carbon atoms. Of these solvents, isopropanol and diacetone alcohol have proved to be the most successful. The presence of the hydroxyl group seems to impart to these solvents. properties which make them particularly useful.

In carrying out the extraction of the antioxidants from the oils and oil-bearing solids with which they are associated, the material to be treated is first mixed with the particular solvent to be employed. The relative proportion of material to solvent may vary widely; preferably, the ratio of solvent to material should be greater than one and, in most cases, mixtures containing between about 2% and about 25% oil are most suitable. Where oil is being treated, it is preferable to cause substantially all the oil to dissolve in the solvent; when employing the preferred solvents complete solution is ordinarily effected most readily by heating the mixture to a temperature substantially above room temperature. However, it is not necessary to cause the oil to dissolve completely in the solvent, since highly active antioxidant fractions may be extracted from the oil and oil-bearing solids by agitating the oil or solid with the solvent at a temperature such that only partial solution is effected. The extraction is preferably carried out in an inert gas atmosphere; furthermore, if fat-soluble vitamins are present in the oil being extracted, it is not advisable to heat the mixture to temperatures substantially in excess of 175° C. if recovery of the vitamins is desired.

The antioxidant fraction extracted from the oil may be recovered in any suitable manner. When the oil is completely dissolved in the solvent at somewhat elevated temperatures, the recovery of the antioxidant extract is most conveniently accomplished by cooling the solution to a temperature substantially below room temperature, e. g. between about 0° C. and about —70° C., whereby two layers form.

The solvent layer obtained from the extraction above described may be filtered and then treated to remove the solvent therefrom, e. g., by vacuum distillation, whereby an extract is recovered containing relatively large amounts of highly active antioxidants. If desired, water may be added to the extract in order to precipitate some of the glycerides contained therein or some of the sterols may be removed; however, these steps are not essential, since the glycerides and sterols do not inhibit the antioxidant properties of the extract. If the extract contains an excessive amount of free fatty acids, these are preferably removed by treatment with alkali in a solvent medium or by other suitable methods. The extract ordinarily possesses the characteristic odor and color of the oil from which it is obtained and is generally slightly more viscous than the original oil.

Although it is preferred to use antioxidant concentrates extracted from various fatty materials as above set forth and more completely described and claimed in the aforementioned Patents Nos. 2,345,576 and 2,345,578; the present process is generally applicable to other types of antioxidant concentrates obtained by solvent extraction of antioxidant-containing vegetable oils or solids. However, it is preferred to use antioxidant concentrates which are extracted in accordance with the methods of the aforementioned patents by means of isopropanol from various vegetable oils and oil-bearing solids such as corn oil, soybean oil, etc.

Preferably, the fish liver oil and the like, having an antioxidant concentrate of the character previously set forth added thereto, is treated with ammonia in the presence of a suitable solvent for the fish liver oil. Similarly, when an antioxidant concentrate is first treated with ammonia, a suitable solvent is preferably used. The solvent employed in the practice of this invention should be one in which the fatty material to be stabilized is readily soluble and/or in which the antioxidant concentrate is at least partially soluble. Thus, if a fish liver oil or concentrate prepared therefrom is being treated, a hydrocarbon, or halogenated hydrocarbon solvent such as hexane, heptane, octane, ethylene dichloride, trichlorethylene, carbon tetrachloride, cyclohexane, methyl cyclohexane, or benzene may be employed as the solvent, as well as solvents such as acetone, diacetone alcohol, and the like. Further, mixtures of the above solvents may also be used. Thus a mixture of equal parts of acetone and methanol has been found especially suitable.

The amount of solvent employed should be at least equivalent to, and in some instances, in excess of the amount of material being treated. The amount of ammonia used in the process is relatively small as compared to the quantity of fatty material or fish liver oil being treated, and may vary from about 1 to 20% by weight of concentrated aqueous ammonia, as compared to the weight of the fatty material. When gaseous ammonia or liquid ammonia is used, the amount is equivalent to that quantity of concentrated aqueous ammonia above set forth. It is to be understood that liquid or gaseous ammonia may be used in the present process. It is desired to point out, therefore, that when in the specification and claims, the term "ammonia" is used, liquid or gaseous ammonia, and ammonia dissolved in water or other suitable solvent therefor, is intended. In general, the quantity of antioxidant concentrate which is added to the fish liver oil and the like is relatively small, being in the neighborhood of 2%, although in some instances from 0.1 to 20% may be used. Preferably, however, from 0.5% to about 5% of antioxidant concentrate is sufficient to greatly enhance the stability of fatty materials of the character set forth.

It may be noted that where the antioxidant concentrate or extract is treated with ammonia before being added to the fatty material to be stabilized, the amount of ammonia used is equivalent to that just set forth, i. e. approximately equal to and in some instances considerably less than the weight of the concentrate.

The following examples are intended to illustrate the invention without in any way limiting the same.

*Example I*

50 lbs. of crude corn oil were mixed with 163.6 lbs. of 91% isopropanol in the presence of nitrogen gas. The mixture was heated while stirring to 50° C. and agitated at that temperature for 15 minutes and then cooled to 23° C. and removed to a low temperature ice box at —25° C. After standing for approximately 40 hours, the supernatant liquid was filtered and the insoluble oil again extracted, this time with 145 lbs. of 91% isopropanol.

These two extracts were combined and freed of solvent in the presence of nitrogen gas. A mixture of 25 gr. of carbon refined shark liver oil having dissolved therein 2% of the corn oil antioxidant prepared as just described was mixed with 100 ml. of acetone and 5 ml. of concentrated ammonium hydroxide. The mixture was then heated at reflux temperature for 3 hours. The solvent was then removed by vacuum distillation, in the presence of an inert gas. The thus stabilized liver oil gave the following results when kept at 34.5° C.

| Sample | Per cent Vitamin A Destruction at 34.5° C. After— | | | |
|---|---|---|---|---|
| | 6 days | 14 days | 20 days | 27 days |
| Stabilized shark liver oil of Example I | 1.81 | 3.62 | 5.81 | 6.55 |

Example II

To a second sample of the shark liver oil of Example I, 2% of untreated corn oil antioxidant prepared as in Example I was added. The following results were obtained.

| Sample | Per cent Vitamin A Destruction at 34.5° C. After— | |
|---|---|---|
| | 6 days | 14 days |
| Shark liver oil of Ex. II | 13.2 | 31.8 |

Example III 196 lbs. of 91% isopropanol were poured into a 50 gallon nickel-clad kettle with 60 lbs. of expeller soybean oil, accompanied by stirring and constant addition of nitrogen gas. The mass was cautiously heated to 50° C. within 15 minutes, and kept at that temperature for another 15 minutes and then cooled to 20° C. The oil solvent mixture was then emptied into a stainless steel drum and chilled to —25° C. After standing for 2 days, the solvent (extract) was filtered from the oil.

The second extraction was carried out with 197 lbs. of 91% isopropanol on the insoluble residue in the same manner in which the first extraction was carried out.

The filtered combined extracts were freed of solvent and the residue was also freed of solvent and filtered free of a slight gelatinous precipitate.

A mixture of 25 grams of carbon-refined shark liver oil having dissolved therein 2% of the expeller soybean antioxidant prepared as just described was mixed with 100 ml. of acetone and 5 ml. of concentrated ammonium hydroxide. The mixture was then heated at reflux temperature for 3 hours. The solvent was then removed by distillation in the presence of an inert gas. The thus stabilized liver oil gave the following results when kept at 34.5° C.

| Sample | Per cent Vitamin A Destruction at 34.5° C. After— | | | |
|---|---|---|---|---|
| | 6 days | 14 days | 20 days | 27 days |
| Stabilized shark liver oil of Example III | 3.64 | 10.0 | 13.64 | 16.3 |

Example IV

A soybean oil antioxidant concentrate similar to that described in Example III was added to carbon-refined shark liver oil in the amount of 2% antioxidant to 100% of oil by weight. The following results were obtained.

| Sample | Per cent Vitamin A Destruction at 34.5° C. After— | | | |
|---|---|---|---|---|
| | 6 days | 14 days | 20 days | 27 days |
| Stabilized shark liver oil of Example IV | 1.62 | 10.9 | 19.6 | 34.3 |

Example V

A mixture was made of 10 grams of the soybean antioxidant concentrate of Example IV, 99 ml. of acetone and 1 ml. of ammonium hydroxide. This mixture was heated at reflux temperature for one hour. It is to be noted that not all of the antioxidant concentrate dissolved in the acetone. Thereafter, the solvent was removed by distillation in the presence of an inert gas. Two percent of the resultant activated antioxidant concentrate was added to the shark liver oil of Example IV. The following results were obtained:

| Sample | Per cent Vitamin Destruction at 34.5° C. After— | | | |
|---|---|---|---|---|
| | 6 days | 14 days | 20 days | 27 days |
| Stabilized shark liver oil of Example V | 0 | 5.4 | 10.8 | 17.7 |

Example VI

The experiment of Example V was repeated, except that 5 ml. of concentrated ammonium hydroxide solution were used. The following results were obtained.

| Sample | Per cent Vitamin A Destruction at 34.5° C. After— | | | |
|---|---|---|---|---|
| | 6 days | 14 days | 20 days | 27 days |
| Stabilized shark liver oil of Example VI | 1.26 | 6.12 | 12.15 | 11.0 |

Example VII

The experiment of Example V was repeated except that 10 ml. of concentrated ammonium hydroxide solution were used. The following results were obtained.

| Sample | Per cent Vitamin Destruction at 34.5° C. After— | | | |
|---|---|---|---|---|
| | 6 days | 14 days | 20 days | 27 days |
| Stabilized shark liver oil of Example VII | 2.14 | 6.4 | 13.0 | 24.2 |

Example VIII

A mixture was made of 10 grams of the antioxidant concentrate of Example I, 90 ml. of isopropanol and 10 ml. of concentrated ammonium hydroxide. The mixture was heated at reflux temperature for one hour and thereafter the solvent was removed. Two percent of the so activated antioxidant concentrate was added to the shark liver oil of Examples I and II. The following results were obtained.

| Sample | Per cent Vitamin A Destruction At 34.5° C. After— | |
|---|---|---|
| | 6 days | 14 days |
| Stabilized shark liver oil as per Example VIII | 8.52 | 25.9 |

It will be noted from the foregoing that, in general, the process according to the present invention involves adding to a fatty material prone to oxidation such as fish liver oil, a relatively small quantity of an antioxidant concentrate obtained by solvent extraction from vegetable materials selected from the class consisting of vegetable oils and vegetable oil-bearing solids, thereafter adding to the mixture of antioxidant concentrate and fatty material a relatively small quantity of ammonia and then refluxing, preferably in the presence of a solvent for the fatty material or fish liver oil.

Example II, it is noted, does not correspond with the process just above set forth. This example, however, serves to illustrate the remarkable increase in stability obtained by the practice of the process set forth. Thus, the shark liver oil of Example I, although greatly improved by the addition of 2% of corn oil antioxidant as in Example II, shows substantial vitamin destruction after 14 days, i. e. 31.8%. On the other hand, only 3.62% of the vitamin is destroyed where the identical shark liver oil is treated as set forth in Example I at the end of a similar period.

It will be noted further that the process may also be practiced by first treating an antioxidant concentrate of the character set forth with a small amount of ammonia in the presence of a solvent in which the antioxidant concentrate is at least partially soluble. Thereafter, the so activated antioxidant concentrate may be added to the fatty material prone to oxidation.

Having described our invention, what we claim as new and desire to be secured by Letters Patent is:

1. A process for the stabilization of fatty materials prone to oxidation which comprises adding to the fatty material an antioxidant concentrate—obtained by contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed and separating the solvent layer containing the antioxidant—and contacting the mixture of antioxidant concentrate and fatty material with a relatively small amount of ammonia.

2. A process for the stabilization of fat-soluble vitamin-containing materials of marine origin prone to oxidation which comprises adding to the vitamin-containing material an antioxidant concentrate—obtained by contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed and separating the solvent layer containing the antioxidant—and contacting the mixture of antioxidant concentrate and vitamin-containing material with a relatively small amount of ammonia.

3. A process for the stabilization of fatty materials prone to oxidation which comprises adding to the fatty material an antioxidant concentrate—obtained by contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed and separating the solvent layer containing the antioxidant—and contacting the mixture of antioxidant concentrate and fatty material with a relatively small amount of ammonia in the presence of a solvent for the fatty material.

4. A process for the stabilization of fat-soluble vitamin-containing materials of marine origin prone to oxidation which comprises adding to the vitamin-containing material an antioxidant concentrate—obtained by contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed and separating the solvent layer containing the antioxidant—and contacting the mixture of antioxidant concentrate and vitamin-containing material with a relatively small amount of ammonia in the presence of a solvent for the fatty material.

5. A process for the stabilization of fatty materials prone to oxidation which comprises adding to the fatty material an antioxidant concentrate—obtained by contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed and separating the solvent layer containing the antioxidant—and heating the mixture of antioxidant concentrate and fatty material with a relatively small amount of ammonia in the presence of acetone.

6. A process for the stabilization of fat-soluble vitamin-containing materials of marine origin prone to oxidation which comprises adding to the vitamin-containing material an antioxidant concentrate—obtained by contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed and separating the solvent layer containing the antioxidant—and heating the mixture of antioxidant concentrate and vitamin-containing material with a relatively small amount of ammonia in the presence of acetone.

7. A process for the stabilization of fish liver oils or oil prone to oxidation which comprises adding to the fish liver oil an antioxidant concentrate—obtained by contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed and separating the solvent layer containing the antioxidant—and heating the mixture of antioxidant concentrate and fish liver oil with a relatively small amount of ammonia in the presence of acetone.

8. A process for the stabilization of fatty materials prone to oxidation which comprises adding to the fatty material an antioxidant concentrate—obtained by contacting a natural antioxidant-containing vegetable material selected from the class consisting of vegetable oils and vegetable oil-bearing solids with isopropanol at a temperature above room temperature, cooling the mass to a temperature below 0° C. whereby layers are formed and separating the isopropanol layer containing the antioxidant—and heating the mixture of antioxidant concentrate and fatty material with a relatively small amount of ammonia in the presence of a solvent for the fatty material.

9. A process for the stabilization of fat-soluble vitamin-containing materials of marine origin prone to oxidation which comprises adding to the vitamin-containing material an antioxidant concentrate—obtained by contacting a natural antioxidant-containing vegetable material selected from the class consisting of vegetable oils and vegetable oil-bearing solids with isopropanol at a temperature above room temperature, cooling the mass to a temperature below 0° C. whereby layers are formed and separating the isopropanol layer containing the antioxidant—and heating the mixture of antioxidant concentrate and vitamin-containing material with a relatively small amount of ammonia in the presence of a solvent for the fatty material.

10. A process for the stabilization of fish liver oils or oil prone to oxidation which comprises adding to the fish liver oil an antioxidant concentrate—obtained by contacting a natural antioxidant-containing vegetable material selected from the class consisting of vegetable oils and vegetable oil-bearing solids with isopropanol at a temperature above room temperature, cooling the mass to a temperature below 0° C. whereby layers are formed and separating the isopropanol layer containing the antioxidant—and refluxing the mixture of antioxidant concentrate and fish liver oil with a relatively small amount of ammonia in the presence of acetone.

11. A process for the production of antioxidants for fatty materials which comprises contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed, separating the solvent layer containing the antioxidant concentrate and contacting the antioxidant concentrate with ammonia to increase its antioxidant activity.

12. A process for the production of antioxidants for fatty materials which comprises contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed, separating the solvent layer containing the antioxidant concentrate and contacting the antioxidant concentrate with ammonia in the presence of a solvent for said concentrate to increase its antioxidant activity.

13. A process for the production of antioxidants for fatty materials which comprises contacting a natural antioxidant-containing vegetable material selected from the class consisting of vegetable oils and vegetable oil-bearing solids with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms, and aliphatic ketones containing not more than 6 carbon atoms at a temperature above room temperature, cooling the mass to a temperature below 0° C. whereby layers are formed, separating the solvent layer containing the antioxidant concentrate and contacting the antioxidant concentrate with ammonia in the presence of acetone to increase its antioxidant activity.

14. A process for the production of antioxidants for fatty materials which comprises contacting a crude vegetable oil with isopropanol at a temperature above room temperature, cooling the mass to a temperature below 0° C. whereby layers are formed, separating the isopropanol layer containing the antioxidant concentrate and refluxing an acetone solution of said concentrate with ammonia to increase its antioxidant activity.

15. A process for the production of antioxidants for fatty materials which comprises contacting a vegetable oil-bearing solid with isopropanol at a temperature above room temperature, cooling the mass to a temperature below 0° C. whereby layers are formed, separating the isopropanol layer containing the antioxidant concentrate and refluxing an acetone solution of said concentrate with ammonia to increase its antioxidant activity.

16. A process for the production of antioxidants for fatty materials which comprises contacting a crude vegetable oil with isopropanol at a temperature above room temperature, cooling the mass to a temperature below 0° C. whereby layers are formed, separating the isopropanol layer containing the antioxidant concentrate and refluxing an acetone solution of said concentrate with ammonium hydroxide to increase its antioxidant activity.

17. A process for the production of antioxidants for fatty materials which comprises contacting a vegetable oil-bearing solid with isopropanol at a temperature above room temperature, cooling the mass to a temperature below 0° C. whereby layers are formed, separating the isopropanol layer containing the antioxidant centrate and refluxing an acetone solution of said concentrate with ammonium hydroxide to increase its antioxidant activity.

18. A highly active antioxidant concentrate prepared by the process set forth in claim 12.

19. A highly active antioxidant concentrate prepared by the process set forth in claim 13.

20. A highly active antioxidant concentrate prepared by the process set forth in claim 16.

21. A highly active antioxidant concentrate prepared by the process set forth in claim 17.

LORAN O. BUXTON.
CHARLES E. DRYDEN.

REFERENCES CITED

The following references are of record in the file of this patent:

UNITED STATES PATENTS

| Number | Name | Date |
| --- | --- | --- |
| 2,075,824 | Musher | Apr. 6, 1937 |
| 2,282,808 | Musher | May 12, 1942 |
| 2,098,254 | Mattill et al. | Nov. 9, 1937 |
| 2,394,968 | Van Orden | Feb. 12, 1946 |
| 2,295,179 | Loane | Sept. 8, 1942 |